United States Patent [19]

Hosoya et al.

[11] Patent Number: 5,351,091
[45] Date of Patent: Sep. 27, 1994

[54] BURST PHASE CORRECTING CIRCUIT

[75] Inventors: Nobukazu Hosoya, Nara; Yoshichika Hirao, Neyagawa, both of Japan

[73] Assignee: Sanyo Electric Co., Ltd., Moriguchi, Japan

[21] Appl. No.: 3,385

[22] Filed: Jan. 12, 1993

[30] Foreign Application Priority Data

Jan. 14, 1992 [JP] Japan .................. 4-004929
Feb. 14, 1992 [JP] Japan .................. 4-061379
Feb. 28, 1992 [JP] Japan .................. 4-043860

[51] Int. Cl.$^5$ .................. H04N 9/455
[52] U.S. Cl. .................. 348/505; 348/536
[58] Field of Search .................. 358/19, 20, 18, 17, 358/148, 153, 158, 310, 320, 324, 325, 326; 360/26, 36.1, 36.2; 348/500, 502, 505, 506, 536, 537, 539; H04N 9/45, 7/455

[56] References Cited

U.S. PATENT DOCUMENTS

| | | | |
|---|---|---|---|
| 4,150,395 | 4/1979 | Pritchard | 358/325 |
| 4,170,023 | 10/1979 | Yamakoshi et al. | 358/19 |
| 4,352,121 | 9/1982 | Lilley | 358/326 |
| 4,403,244 | 9/1983 | Fujishima | 358/19 |
| 4,631,600 | 12/1986 | Fukui | 358/326 |
| 4,635,097 | 1/1987 | Tatami | 358/19 |
| 4,647,984 | 3/1987 | Suzuki et al. | 358/326 |
| 4,688,081 | 8/1987 | Furuhata et al. | 358/19 |
| 4,797,730 | 1/1989 | Smith | 358/326 |

FOREIGN PATENT DOCUMENTS

| | | |
|---|---|---|
| 0265085 | 4/1988 | European Pat. Off. . |
| 0390226 | 10/1990 | European Pat. Off. . |
| 93100481.6 | 12/1993 | European Pat. Off. . |
| 2-19096 | 1/1990 | Japan . |
| 2076255 | 11/1981 | United Kingdom . |

Primary Examiner—James J. Groody
Assistant Examiner—Michael H. Lee
Attorney, Agent, or Firm—Armstrong, Westerman, Hattori, McLeland & Naughton

[57] ABSTRACT

A burst phase correcting circuit includes a first all-pass filter which receives a chrominance sign inputted from a terminal. A phase reference signal from an oscillator is applied to a first phase-comparator together with an output signal from the first all-pass filter, after the same is phase-shifted by 90 degrees by a first phase-shifter. A signal according to a phase difference of the both signals is outputted from the first phase-comparator and applied to the first all-pass filter via a first low-pass filter and a capacitor. Therefore, in the first all-pass filter, a delay time is varied in accordance with the phase difference between the chrominance signal and the phase reference signal. Therefore, a jitter component of the chrominance signal can be removed.

13 Claims, 10 Drawing Sheets

INPUT SIGNAL

BURST TIMING SIGNAL

BURST GATE PULSE (BGP)

F I G.10
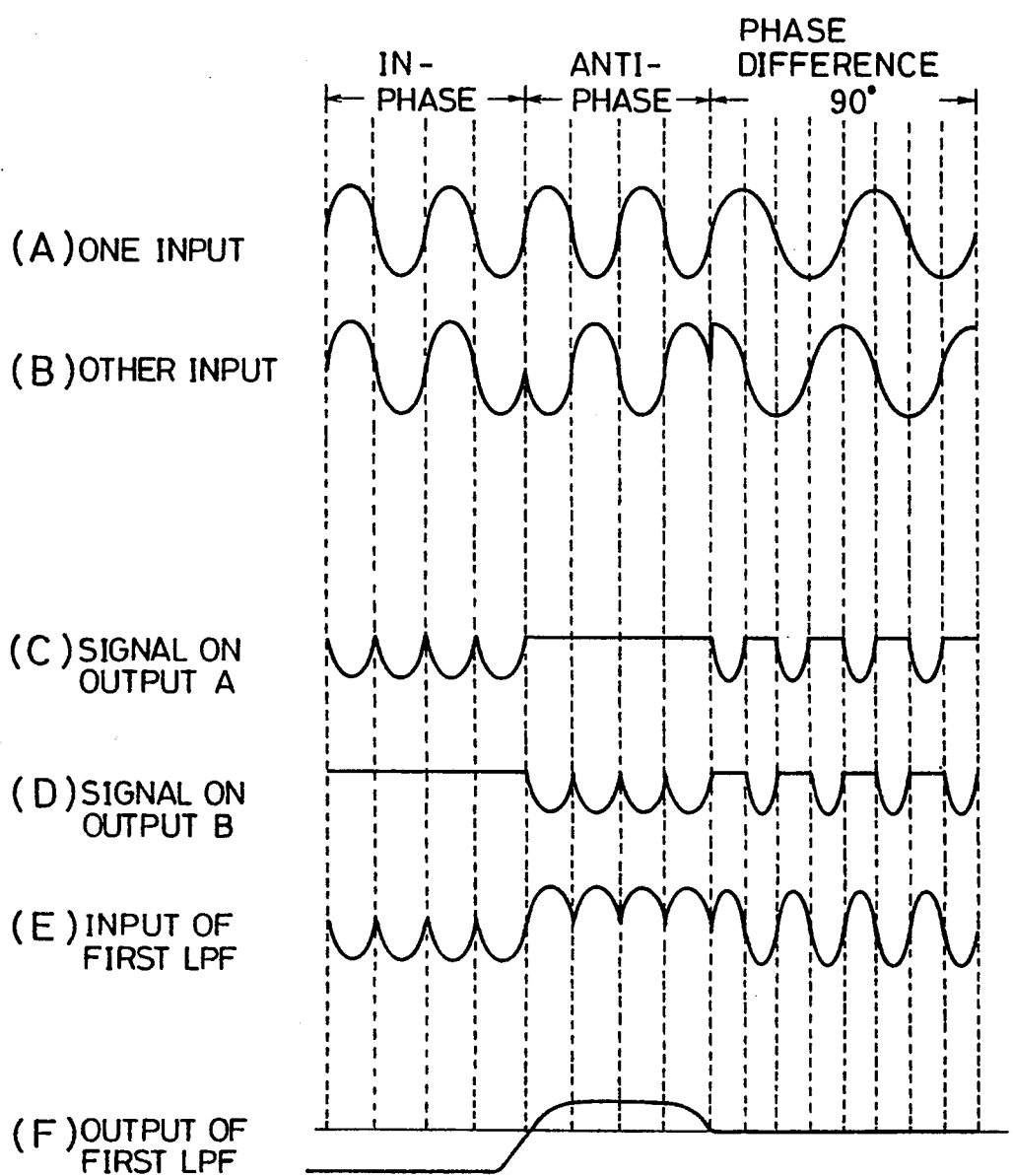

F I G. 11
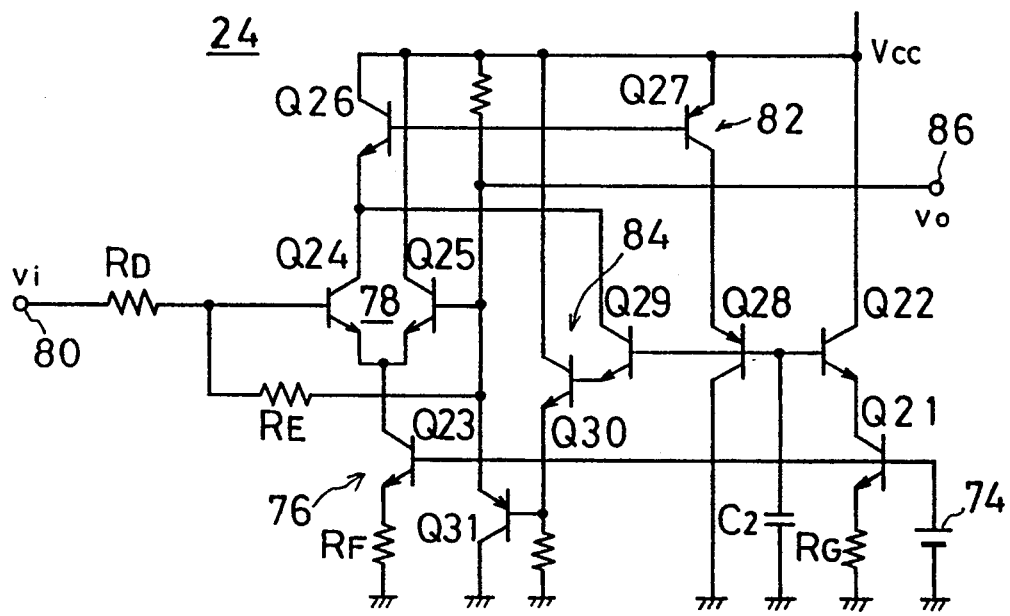
F I G. 12
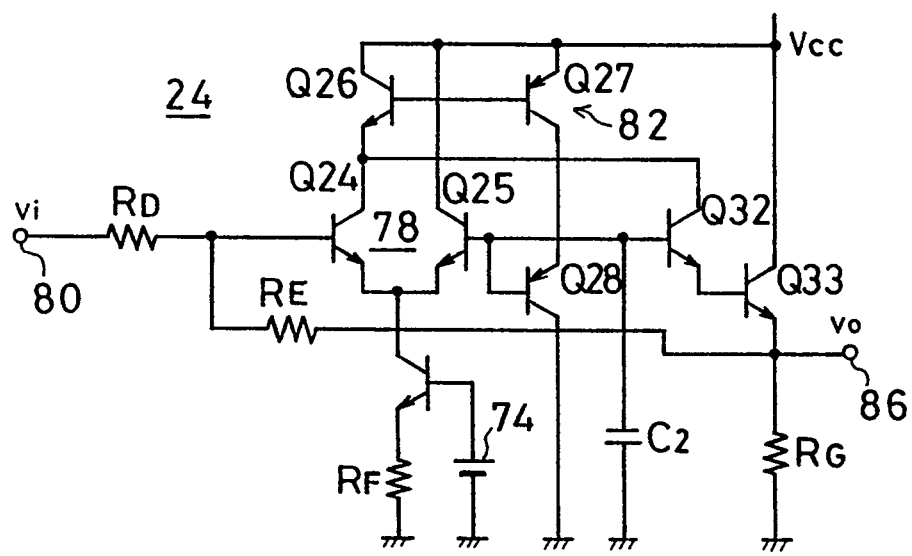

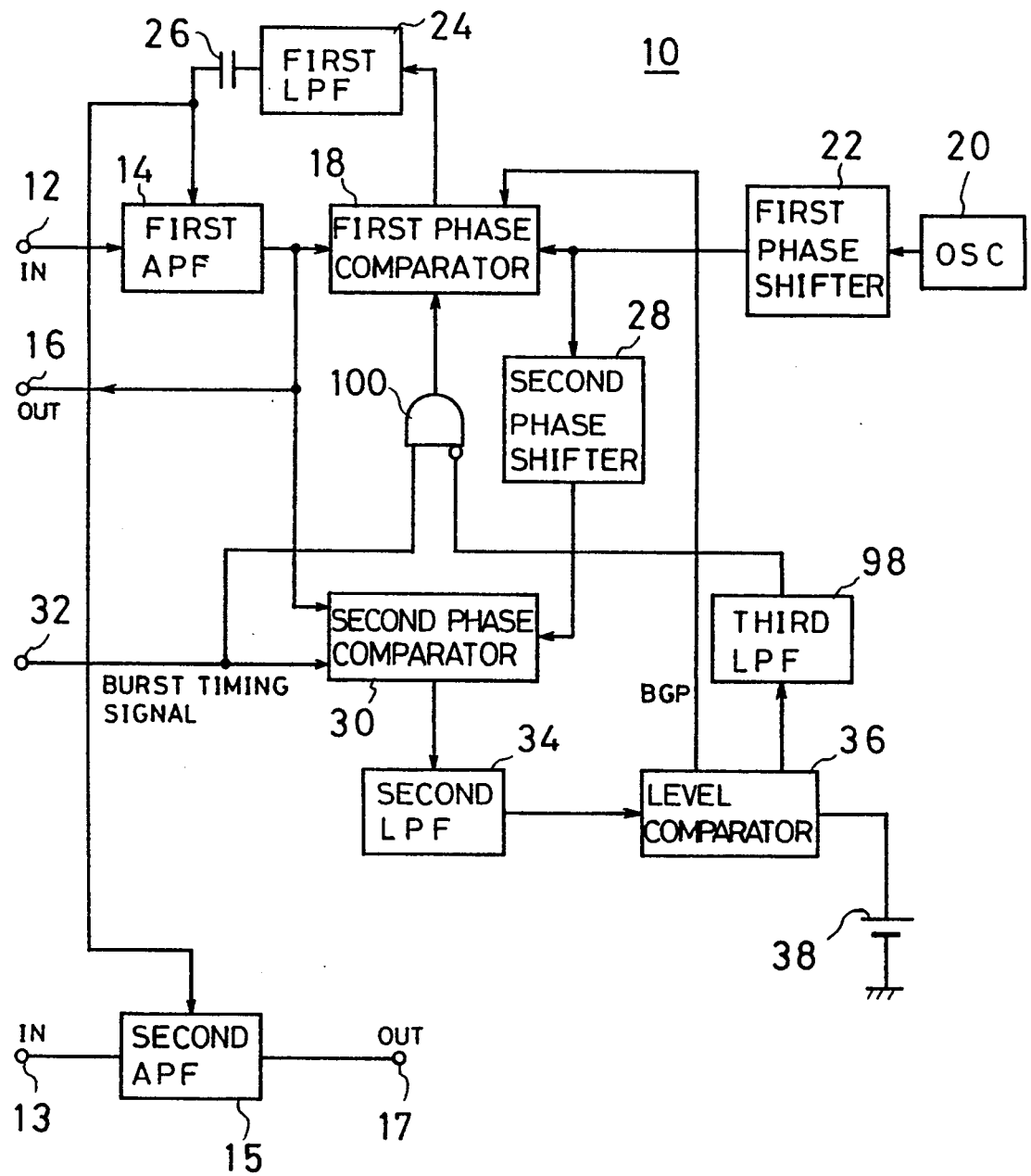
F I G. 14

F I G. 15
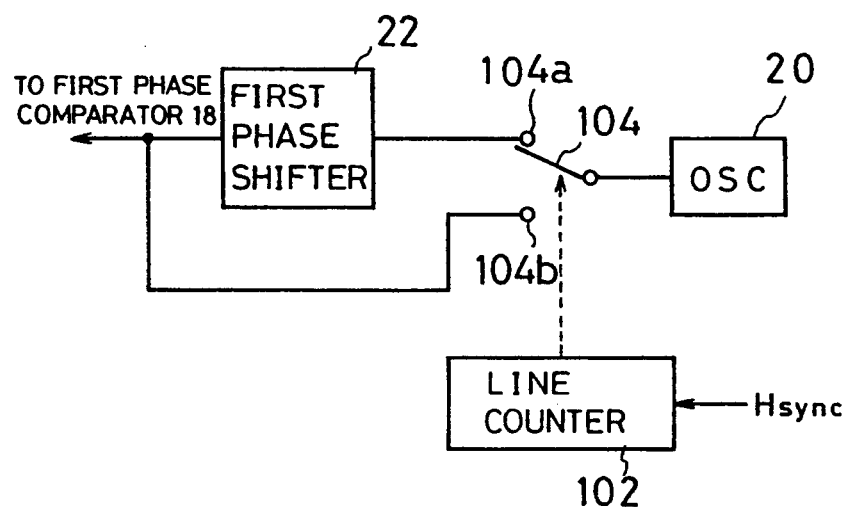

BURST PHASE CORRECTING CIRCUIT

BACKGROUND OF THE INVENTION

1. Field of the Invention

The present invention generally relates to a burst phase correcting circuit. More specifically, the present invention relates to a burst phase correcting circuit which performs correction of a phase of a chrominance signal on the basis of a phase reference signal in a video tape recorder, video disk player, television receiver and etc.

2. Description of the Prior Art

In a video tape recorder, video disk player and etc., a hue jitter due to instability of a servo circuit or the like occurs. In order to remove such a jitter component, a phase of a color burst included in a reproduced chrominance signal may be corrected. One example of such a kind of burst phase correcting circuit is disclosed in, for example, Japanese Patent Application Laying-Open No. 2-19096 [H04N 9/83] laid-open on Jan. 23, 1990. In this prior art shown in FIG. 1, a chrominance signal is inputted to a terminal 1, and the chrominance signal is applied to an automatic phase control circuit 2. In the automatic phase control circuit 2, a phase of the chrominance signal is controlled on the basis of a horizontal synchronization signal $H_{sync}$ and a reference frequency signal $f_{ref}$ from an oscillator 4. An output from the automatic phase control circuit 2 is withdrawn at a terminal 9 through a phase adjustment circuit 3.

On the other hand, an output signal of the automatic phase control circuit 2 is also applied to one input of a phase-comparator 6 included in a control signal generating circuit 5, and the above described reference frequency signal $f_{ref}$ is applied to the other input of the phase-comparator 6. Accordingly, the phase-comparator 6 compares phases of the two signals with each other, and outputs a pulse having a width according to a phase difference of the both signals so as to apply to a low-pass filter 8 via a gate 7 which is controlled by the horizontal synchronization signal $H_{sync}$. Therefore, a control signal having a level according to the phase difference of the both signals is outputted from the low-pass filter 8 and applied to the aforementioned phase adjustment circuit 3.

In the phase adjustment circuit 3, the phase of the chrominance signal outputted from the automatic phase control circuit 2 is further finely adjusted in accordance with the control signal. Therefore, at the terminal 9, a chrominance signal having a phase which is controlled by the automatic phase control circuit 2 and further finely adjusted by the phase adjustment circuit 3 is outputted. Therefore, even if a jitter component is included in the reproduced chrominance signal, the jitter component can be removed.

Since the above described prior art is a feed forward system, it is necessary to provide a level adjustment circuit (not shown) between the low-pass filter 8 and the phase adjustment circuit 3, for example, and to produce a control signal which is coincident with a characteristic of a control signal level-phase of the phase adjustment circuit 3 on the basis of an output of the low-pass filter 8. Such a kind of level adjustment circuit is complex and high cost.

Therefore, it can be considered that in the prior art shown in FIG. 1, a circuit of a feed-back system in which an output of the phase adjustment circuit 3 is applied to the one input of the phase-comparator 6 instead of the output of the automatic phase control circuit 2 is constructed. If the circuit is a feed-back system, the above described level adjustment circuit becomes unnecessary, and therefore, the circuit becomes simple and low cost.

However, in a case where a circuit of a feed-back system is constructed by applying the above described modification to the prior art shown in FIG. 1, it takes a long time until a phase of the chrominance signal becomes to be synchronized. That is, a pull-in time becomes long. Then, in order to make the pull-in time short, a large direct current component must be fed-back. However, in such a case, a phase-locked loop becomes unstable and, in an extreme case, the prior art becomes not to function as a phase correcting circuit.

SUMMARY OF THE INVENTION

Therefore, a principal object of the present invention is to provide a novel burst phase correcting circuit.

Another object of the present invention is to provide a burst phase correcting circuit which can operate stably with a circuit configuration that is simple and low cost.

Another object of the present invention is to provide a burst phase correcting circuit which can make a pull-in time short while operate stably.

A burst phase correcting circuit in accordance with the present invention comprises: first variable delay means which receives a chrominance signal, and delays the chrominance signal with a delay time according to a control signal, and outputs the chrominance signal; reference signal generating means for generating a reference signal; first phase-shifting means for phase-shifting the reference signal by 90 degrees; timing signal applying means for applying a timing signal; first phase-comparing means for comparing a phase of an output of the first variable delay means with a phase of an output of the first phase-shifting means in response to the timing signal to output a signal according to a difference between the both phases; a first low-pass filter for receiving the signal from the first phase-comparing means; and a capacitor for applying only an alternating current component included in an output of the first low-pass filter to the first variable delay means as the control signal.

A reproduced chrominance signal in a video tape recorder, video disk player and etc., for example, or a demodulated chrominance signal in a television receiver is inputted to the first variable delay means. The first variable delay means includes, for example, an all-pass filter having a controllable time constant, and delays the chrominance signal by a time according to the time constant, and outputs the same. A delay time of the first variable delay means is determined by the control signal which is given from the capacitor. More specifically, the reference signal generated by the reference signal generating means is phase-shifted by 90 degrees by the first phase-shifting means, and applied to the first phase-comparing means together with the output of the first variable delay means. The first phase-comparing means compares the phase of the output of the first variable delay means and the phase of the output of the first phase-shifting means in response to the timing signal applying means, and outputs the signal according to a phase difference of the both phases. An unnecessary signal included in the signal from the first phase-comparing means is removed by the first low-pass filter. Therefore, only a necessary signal included in the output of the first phase-comparing means is applied to the first variable delay means as the above described control signal via the capacitor. That is, the capacitor applies only the alternating current component of the necessary signal included in the output of the first low-pass filter to the first variable delay means.

In accordance with the present invention, a direct current component included in the output of the first low-pass filter is cut-off by the capacitor, and therefore, as the control signal for the first variable delay means, only the alternating current component included in the output of the first low-pass filter is applied. Therefore, even if a large control signal is fed-back in order to make the response of a loop including the first variable delay means good, stability of the loop does not become bad.

In an aspect of the present invention, the timing signal applying means includes burst signal demodulating means which applies a burst gate signal that is obtained by demodulating a burst signal included in the output of the first variable delay means to the first phase-comparing means. Specifically, a burst signal demodulating means includes second phase-shifting means for further phase-shifting the output of the first phase-shifting means; second phase-comparing means for comparing the phase of the output of the first variable delay means with a phase of an output of the second phase-shifting means in response to the timing signal to output a signal according to a difference between the both phases; a second low-pass filter which receives an output of the second phase-comparing means; and level-comparing means for comparing a level of an output of the second low-pass filter with a reference level to produce the aforementioned burst gate signal. In this aspect, it is possible to vary a timing when the first phase-comparing means is enabled in accordance with the burst signal included in the chrominance signal which is delayed by the first variable delay means, and therefore, even if a chrominance signal with a signal to noise ratio bad is inputted in a case of a weak electric field, for example, it is possible to control a burst phase with accuracy.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a wave-form chart showing an operation of the phase-comparator shown in FIG. 9;

FIGS. 11 and 12 are circuit diagrams respectively showing different examples of a low-pass filter which is used in FIG. 1 embodiment;

FIG. 14 is a block diagram showing another embodiment of a burst phase correcting circuit in accordance with the present invention; and FIG. 15 is a block diagram showing a major portion of a case where the present invention is utilized in a chrominance signal processing circuit of a PAL system.

DETAILED DESCRIPTION OF THE PREFERRED EMBODIMENTS

Figure 2:
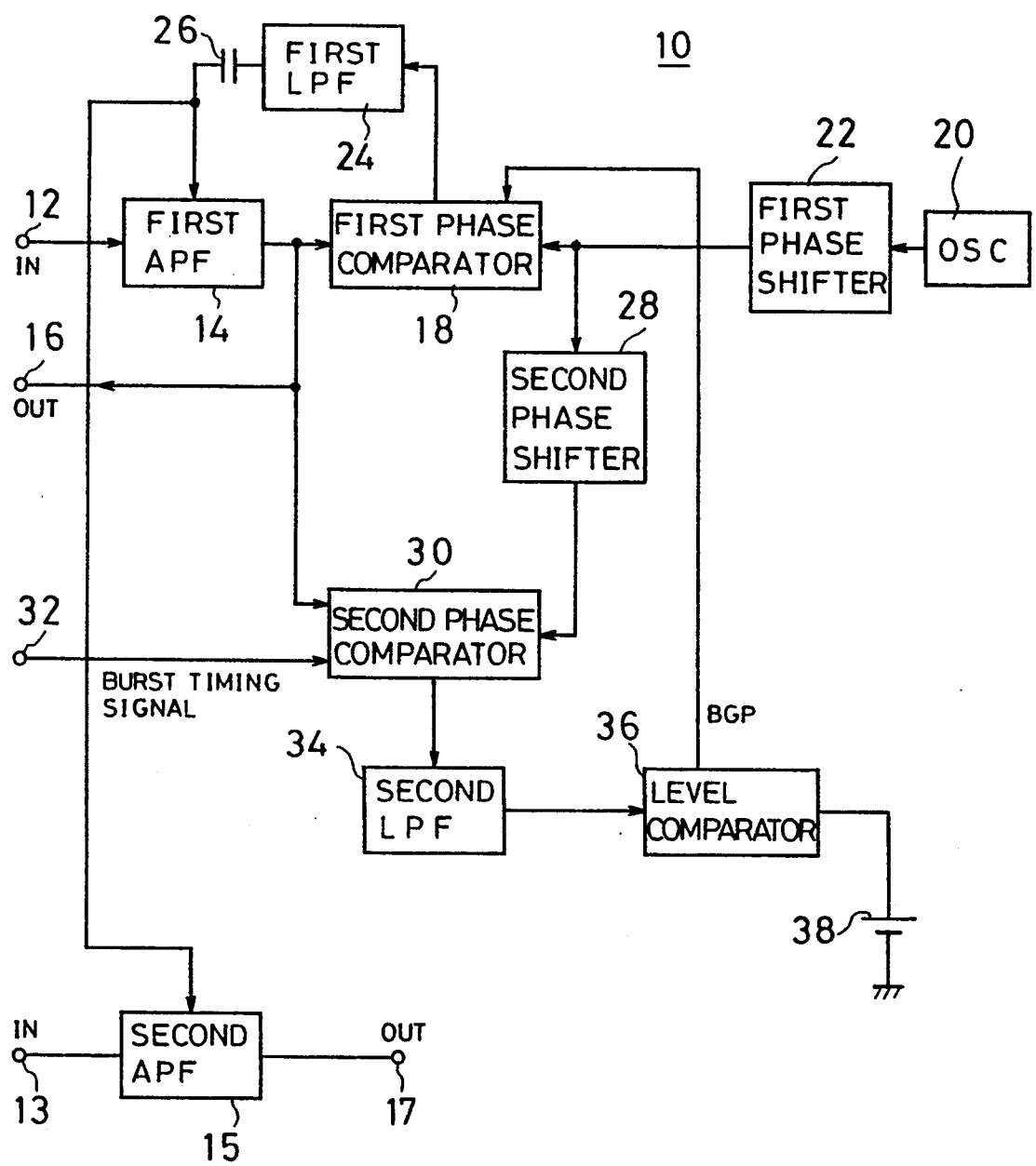
FIG. 2 is a block diagram showing one embodiment of a burst phase correcting circuit in accordance with the present invention.

In a burst phase correcting circuit 10 of an embodiment shown in FIG. 2, a chrominance signal that is inputted to an input terminal 12 is delayed by a necessary time by a first all-pass filter 14 which constitutes a variable delay means. An output from the first all-pass filter 14 is supplied to one input of a first phase-comparator 18. On the other hand, a reference carrier wave signal from a fixed oscillator 20 is supplied to the other input of the first phase-comparator 18 after a phase of the same is shifted by 90 degrees by a first phase-shifter 22. Then, in the first phase-comparator 18, phases of the signals supplied to the two inputs are compared with each other. An output from the first phase-comparator 18 is supplied to the first all-pass filter 14 via a first low-pass filter 24 and a capacitor 26 for cutting-off a direct current component.

On the assumption that an input chrominance signal is "$\sin(A+t)$" and a reference signal from the oscillator 20 is "$\sin A$", the first phase-comparator 18, as described later, multiplies the two signals, and outputs "$\sin(A+t-A)=\sin(t)$" and "$\sin(A+t+A)=\sin(2A+t)$" as detection outputs. Out of the signals, a signal which is really necessary for controlling the all-pass filter 24 is the former, that is, the signal "$\sin(t)$" which includes a jitter component (t). Therefore, the latter signal, that is, "$\sin(2A+t)$" becomes an unnecessary signal.

Then, the first low-pass filter 24 is utilized for removing the unnecessary signal. Thus, an alternating current control signal having an amplitude according to a magnitude of the jitter component is fed-back to the first all-pass filter 14, and a delay time of the first all-pass filter 14 is controlled in accordance with the magnitude of the jitter component.

In addition, a reason why the capacitor 26 for cutting-off a direct current component is utilized is that a circuit configuration of the above described fixed oscillator 20 is made simple. More specifically, if the output of the first low-pass filter 24 is applied as it is to the first all-pass filter 14, a direct current control signal is fed-back to the first all-pass filter 14, and therefore, it is difficult to make a pull-in time (a response time) short while a stability of a loop is not harmed; however, a direct current component included in the output of the first low-pass filter 24 is cut-off by the capacitor 26 and only the alternating current component is applied to the first all-pass filter 14 as the control signal therefor, and therefore, by making the alternating current control signal large, it is possible to make the pull-in time (response time) short with maintaining the loop stable.

Since the capacitor 26 is utilized, it is necessary to set in advance a phase difference of the two inputs of the first phase-comparator 18 at a constant value (90 degrees in this embodiment shown), and therefore, in this embodiment shown, the reference signal is produced by the fixed oscillator 20 having no PLL function and the first phase-shifter 22.

Figure 3A:
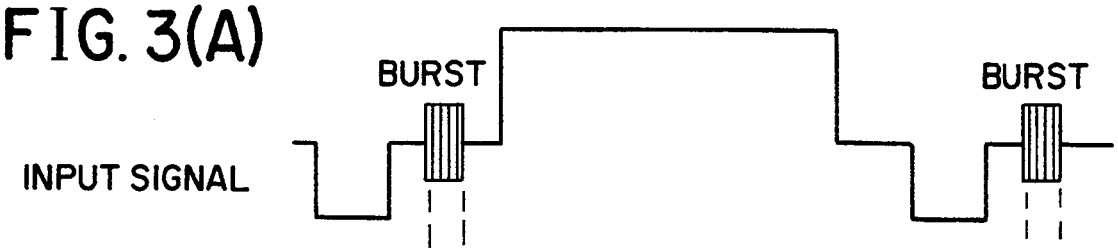
FIG. 3 is a timing chart showing a burst gate signal.
Figure 3B:
Figure 3C:
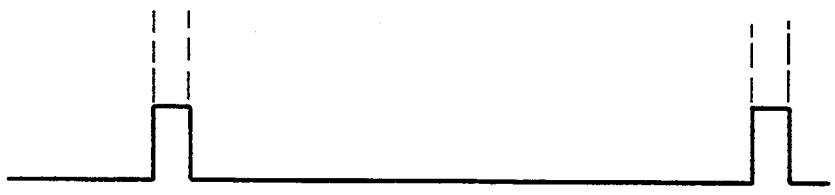

On the other hand, the chrominance signal through the first all-pass filter 14 is also supplied to one input of a second phase-comparator 30. In addition, the reference signal from the first phase-shifter 22 is further phase-shifted by a second phase-shifter 28 by 90 degrees. Therefore, a signal which is obtained by inverting the reference carrier wave signal from the fixed oscillator 20 is supplied to the other input of the second phase-comparator 30. The second phase-comparator 30 is enabled during a period when a burst timing signal which is applied from an input terminal 32 and shown in FIG. 3(B) is a high level, and a demodulated output which indicates a maximum value thereof during a period of a burst signal BURST shown in FIG. 3(A) is obtained from the second phase-comparator 30. The demodulated output is applied to a second low-pass filter 34 having the same function as that of the first low-pass filter 24. Therefore, after an unnecessary signal component is removed by the second low-pass filter 34, the demodulated output of the second phase-comparator 30 is compared with a reference voltage 38 in a level-comparator 36. Then, in the level-comparator 36, a burst gate pulse BGP that becomes a high level during a burst period as shown in FIG. 3(C) is generated and the burst gate pulse BGP is supplied to the first phase-comparator 18. Therefore, the first phase-comparator 18 is enabled during a period when the burst gate pulse BGP is a high level.

Thus, since the burst signal BURST included in the input chrominance signal by utilizing the second phase-comparator 30 is demodulated to produce the burst gate pulse BGP and the first phase-comparator 18 is enabled by the burst gate pulse BGP, a timing when the first phase-comparator 18 is enabled becomes approximately the same as a burst signal period of the inputted chrominance signal. That is, the timing when the first phase-comparator 18 is enabled is varied in accordance with a variation of a phase of the burst signal period of the inputted chrominance signal. Accordingly, even if a chrominance signal with a bad signal to noise ratio is inputted thereto, a burst signal phase can be surely detected, and therefore, it is possible to control the burst signal phase with accuracy.

In addition, the chrominance signal including the burst phase which is corrected by the burst phase correcting circuit 18 thus constructed is outputted from an output terminal 16.

Furthermore, a luminance signal is inputted from an input terminal 13 and outputted from an output terminal 17 through a second all-pass filter 15. then, the second all-pass filter 15 has the same circuit configuration as that of the above described first all-pass filter 14, and a time constant, that is, a delay time of the second all-pass filter 15 is controlled by the alternating current control signal from the capacitor as similar to the first all-pass filter 14. Therefore, the second all-pass filter 15 becomes to have the same delay time as that of the first all-pass filter 14, and the chrominance signal and the luminance signal are sent to succeeding circuits in synchronization with each other.

Figure 4:
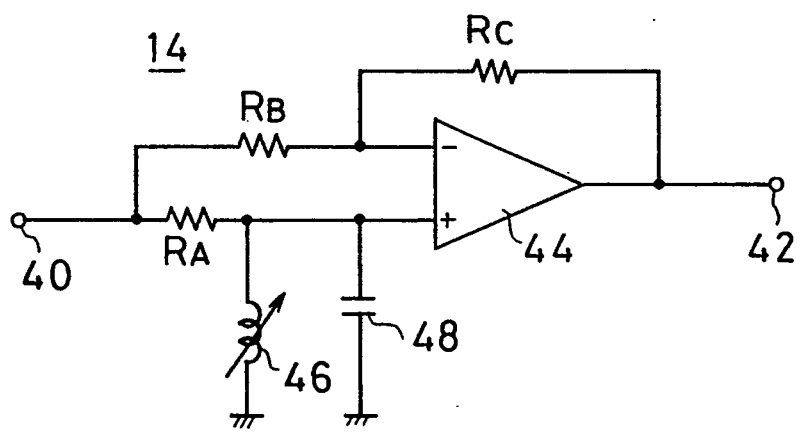
FIG. 4 is a circuit diagram showing one example of all-pass filter which is used in FIG. 1 embodiment.

Now, with referring to FIG. 4, the first all-pass filter 14 will be described in more detail. In addition, as described above, the second all-pass filter 15 is constructed in the same manner as that of the first all-pass filter 14.

An input end 40 of the first all-pass filter 14 is connected to the input terminal 12, and an output end 42 is connected to respective one inputs of the first phase-comparator 18 and the second phase-comparator 30 and the output terminal 16. A differential amplifier 44 is provided between the input end 40 and the output end 42, and the input chrominance signal is supplied to a (+) input of the differential amplifier 44 via a resistor $R_A$. Between the resistor $R_A$ and the (+) input, a parallel circuit of a variable inductor 46 and a capacitor 48 is connected between the (+) input and the ground. More specifically, a band pass filter is constructed by the resistor $R_A$, the variable inductor 46 and the capacitor 48, and the inputted chrominance signal is applied to the (+) input of the differential amplifier 44 through the band pass filter. To a (−) input of the differential amplifier 44, a half of an output of the differential amplifier 44 is fed-back by resistors $R_B$ and $R_C$ ($R_B = R_C$). Therefore, it will be easily understood that a circuit shown in FIG. 4 constitutes an all-pass filter as a whole.

Furthermore, with referring to FIG. 5, the variable inductor 46 which is utilized in the all-pass filter 14 shown in FIG. 4 will be described in more detail. The variable inductor 46 shown in FIG. 5 is convenient to be incorporated within an integrated circuit; however, if it is not necessary to incorporate the same within an integrated circuit, it is unnecessary to say that a variable inductor having a further configuration may be utilized.

Figure 5:
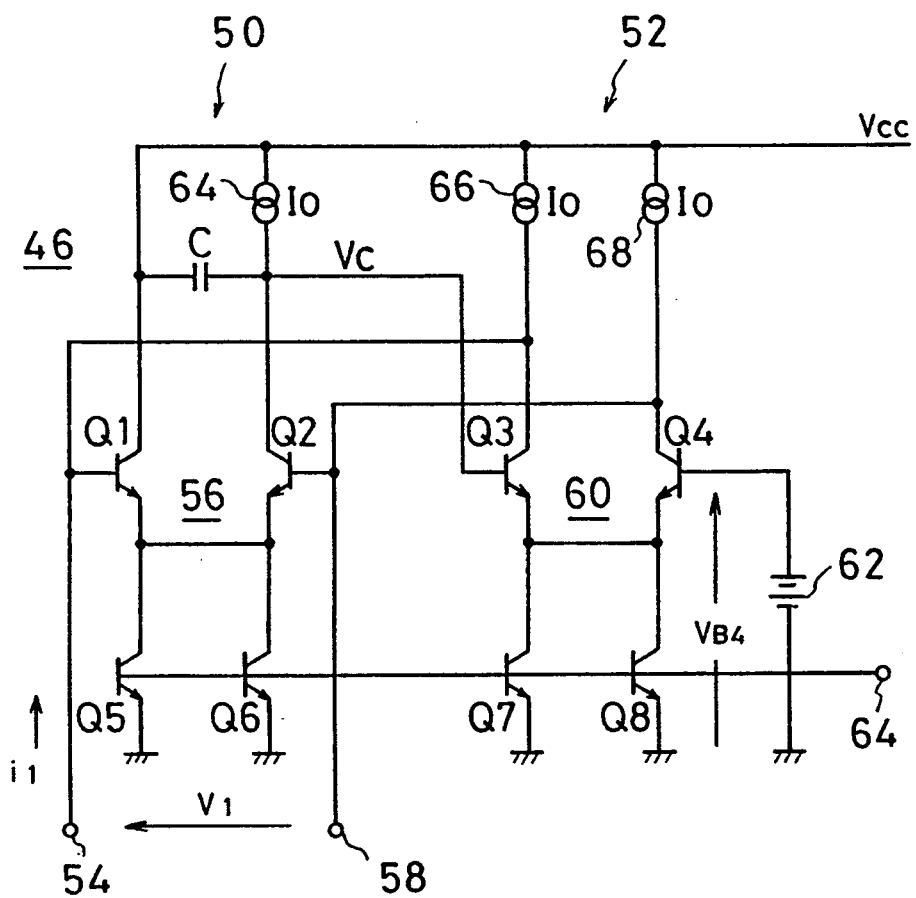
FIG. 5 is a circuit diagram showing one example of a variable inductor which is used in FIG. 4 embodiment.

With referring to FIG. 5, the variable inductor 46 of this embodiment shown includes differential amplifying circuits 50 and 52, and a direct current bias is applied to a base of a transistor Q1 of the differential amplifying circuit 50 from an input end 54. The transistor Q1 constitutes a differential pair 56 together with a transistor Q2, and a base of the transistor Q2 is connected to an output end 58. A capacitor C is inserted between a collector of the transistor Q2 and a direct current voltage source Vcc to which a collector of the transistor Q1 is connected. In addition, an output of the differential pair 56, that is, the collector of the transistor Q2 is connected to a base of a transistor Q3 of the differential amplifying circuit 52. To a base of a transistor Q4 which constitutes a differential pair 60 together with the transistor Q3, a constant fixed bias $V_{B4}$ is supplied by a direct current voltage source 62, and therefore, the base of the transistor Q4 is connected to the ground in alternating current. Then, the collectors of the transistors Q3 and Q4 are respectively connected to the input end 54 and the output end 58. In addition, reference numerals 64, 66 and 68 denote constant current sources (direct current current sources). Similarly, transistors Q5, Q6, Q7 and Q8 respectively inserted between emitters of the transistors Q1, Q2, Q3 and Q4 and the ground respectively constitute constant current sources (current mirror circuit), and a current value thereof is changed by a control voltage which is applied from an input end 64. Furthermore, the capacitor C may be inserted between the collector of the transistor Q2 and the direct current voltage source 62.

In the variable inductor 46 shown in FIG. 5, if a differential resistor each of the transistors Q1 and Q2 is $re_0$, a collector voltage Vc of the transistor Q2 is given by the following equation (1) in a case of an angle frequency is $\omega$.

$$Vc = \frac{1}{j\omega C} \cdot V_1 \cdot \frac{1}{2re_0} \qquad (1)$$

If a differential resistor of each of the transistors Q3 and Q4 is $re_1$, since $i_1 = Vc/2re_1$, a current $i_1$ is shown by the following equation (2), and therefore, the following equation (3) is obtainable.

$$i_1 = \frac{1}{j\omega C} \cdot V_1 \cdot \frac{1}{2re_0} \cdot \frac{1}{2re_1} \qquad (2)$$

$$\frac{V_1}{i_1} = j\omega(C \cdot 2re_0 \cdot 2re_1) \qquad (3)$$

If $L = C \cdot 2re_0 \cdot 2re_1$, the following equation (4) is obtainable.

$$V_1 = j\omega L i_1 \qquad (4)$$

Therefore, an inductance characteristic is obtained between the input end 54 and the output end 58. Therefore, in a case where the variable inductor 46 is used in the all-pass filter 14 shown in FIG. 4, the input end 54 may be connected to the (+) input of the differential amplifier 44 and the input end 58 may be connected to the ground. Furthermore, the control signal from the capacitor 26 (FIG. 1) may be applied to the input end 64. In such a case, in response to the alternating current control signal from the capacitor 26, the current of the transistors Q5-Q8, that is, an inductance value of the variable inductor 46 is changed, and accordingly, a time constant, that is, a delay time of the first all-pass filter 14 can be varied.

Figure 1:
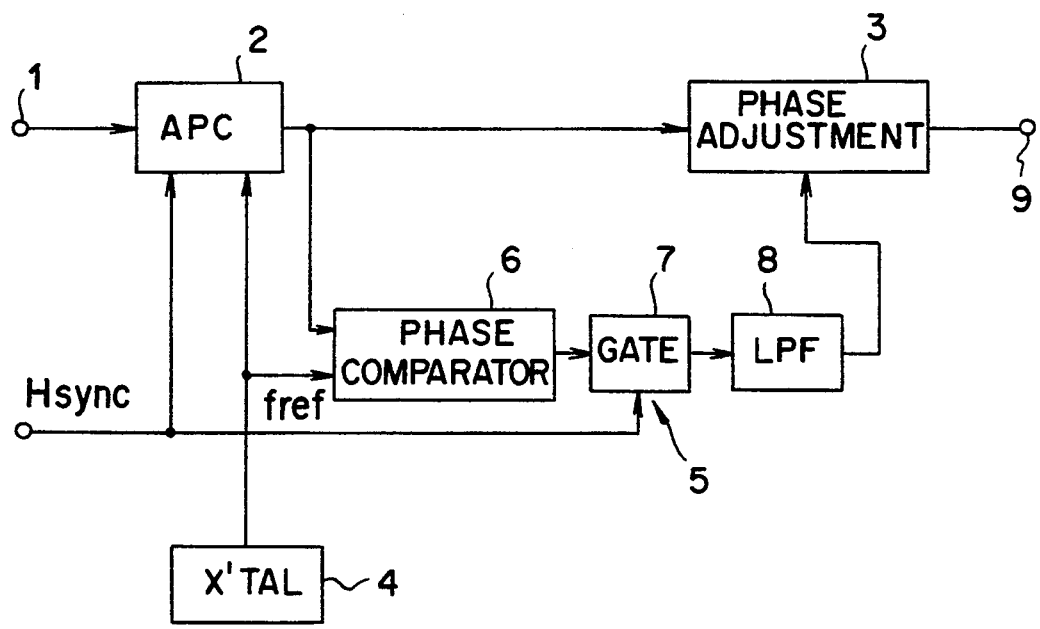
FIG. 1 is a block diagram showing one example of a conventional burst phase correcting circuit.
Figure 6:
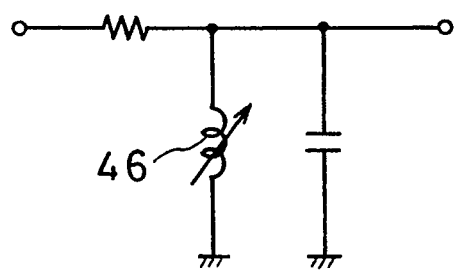
FIGS. 6, 7 and 8 are circuit diagrams respectively showing one examples of a band pass filter, low-pass filter and high-pass filter which can be utilized as a variable delay circuit instead of the all-pass filter in FIG. 1 embodiment.
Figure 7:
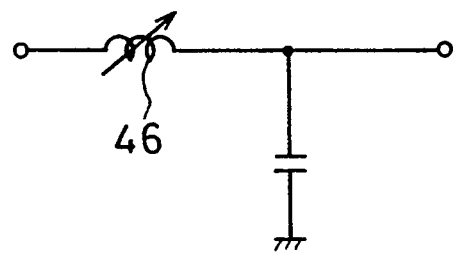
Figure 8:
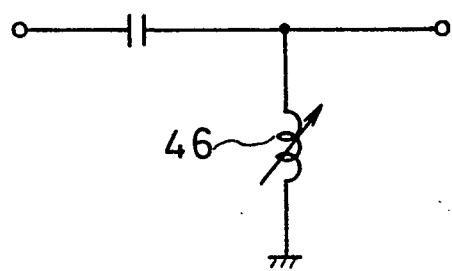

In addition, as the variable delay means, instead of the first (or the second) all-pass filter 14 (or 15) as in FIG. 1 embodiment, any one of a band pass filter, a low-pass filter and a high-pass filter respectively shown in FIG. 6, FIG. 7 and FIG. 8. The variable inductor 46 shown in FIG. 5 may be utilized in FIGS. 6-8, respectively. In this case, in FIGS. 6 and 8, the input end 54 of the variable inductor 46 (FIG. 5) is connected to a hot line, and the input end 58 is connected to the ground. In addition, in FIG. 7, the two input ends 54 and 58 are inserted between a hot line.

Figure 9:
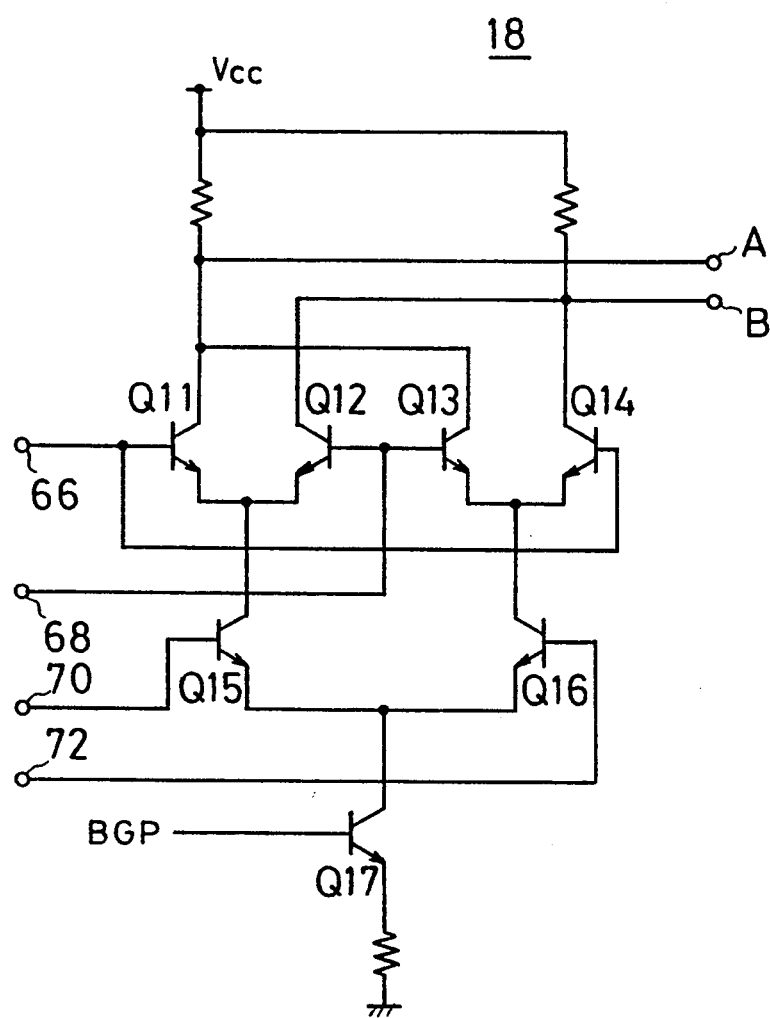
FIG. 9 is a circuit diagram showing one example of a phase-comparator which is used in FIG. 1 embodiment.

In addition, the first (or the second) phase-comparator 18 (or 30) is constructed as shown in FIG. 9 and is operated as shown in FIG. 10. More specifically, a signal as shown in FIG. 10(A) is inputted to input ends 66 and 68, and a signal as shown in FIG. 10(B) is inputted to input ends 70 and 72. Furthermore, the burst gate pulse BGP is applied to a base of a transistor Q17, and therefore, the first phase-comparator 18 is enabled during a period when the burst gate pulse BGP (FIG. 3) is a high level.

In a case where the both signals are in-phase, transistors Q11 and Q15 are turned-on during a positive period of the signal, and transistors Q13 and Q16 are turned-on during a negative period-thereof. Therefore, a voltage at an output end A pulsates toward a negative direction for every half period as shown in FIG. 10(C), and a voltage at an output end B becomes a constant voltage as shown in FIG. 10(D). Accordingly, an output of the first phase-comparator 18 which is withdrawn from the output ends A and B is a difference between FIG. 10(C) and FIG. 10(D), and therefore, becomes as shown in FIG. 10(E). Therefore, from the low-pass filter 24 which receives the output of the first phase-comparator 18 outputs a negative control signal as shown in FIG. 10(F) when the both signals are in-phase.

In a case where the both signals are anti-phase, transistors Q14 and Q16 are turned-on during a positive period of a signal inputted to the input ends 66 and 68, and transistors Q12 and Q15 are turned-on during a negative period of the signal. Therefore, a voltage at the output end A becomes constant as shown in FIG. 10(C), and a voltage at the output end pulsates toward a negative direction for every half period as shown in FIG. 10(D). Accordingly, the output of the first phase-comparator 18 which is withdrawn from the output ends A and B is a difference between FIG. 10(C) and FIG. 10(D), and becomes as shown in FIG. 10(E). Therefore, the low-pass filter 24 outputs a positive control signal as shown in FIG. 10(F) when the both signals are anti-phase.

In a case where the both signals have a phase difference of 90 degrees, the transistors Q11 and Q15 are turned-on in a front half of a front half period of the signal from the input ends 66 and 68, and the transistors Q14 and Q16 are turned-on in a rear half thereof. Furthermore, the transistors Q13 and Q16 are turned-on in a front half of a rear half period of the signal from the input ends 66 and 68, and the transistors Q12 and Q15 are turned-on in a rear half thereof. Therefore, a voltage at the output end A becomes a negative voltage in only the front halves of the respective half periods as shown in FIG. 10(C), and a voltage at the output end B appears as a negative voltage in the rear halves of the respective half periods as shown in FIG. 10(D). Therefore, the output of the first phase-comparator 18 which is withdrawn from the output ends A and B becomes as shown in FIG. 10(E), and the low-pass filter 24 outputs a control signal of approximately zero as shown in FIG. 10(F) when the both signals have a phase difference of 90 degrees.

Thus, when the phase difference of the both signals inputted to the first phase-comparator 18 is 90 degrees, a control signal of approximately zero is outputted from the low-pass filter 24. When the phase difference of the both signals is deviated from the 90 degrees, a positive or negative control voltage according to a deviation amount is outputted from the low-pass filter 24. Such a control signal from the low-pass filter 24 is inputted to the first all-pass filter 14 as the control signal therefor via the capacitor 26.

Now, with referring to FIG. 11, the low-pass filter 24 of FIG. 1 embodiment will be described in more detail. In FIG. 11, since a direct current bias voltage is applied to a base of a transistor Q21 from a direct current voltage source 74, at the same time when the transistors Q21 and Q22 are turned-on, a transistor Q23 which constitutes a current mirror circuit 76 together with the transistor Q21 is turned-on. Therefore, an input differential pair 78 which is constituted by transistors Q24 and Q25 is enabled. When an input signal from the first phase-comparator 18 is applied to a base of the transistor Q24 via an input end 80 and a resistor $R_D$, the transistor Q24 is turned-on, and the input signal charges a capacitor C2 via a collector of the transistor Q24 through a current mirror circuit 82 which is constituted by transistors Q26, Q27 and Q28. On the other hand, the capacitor C2 is discharged via the transistors Q21 and Q22. A charge discharged from the capacitor C2 is supplied to a base of the transistor Q25 via a double-Darington circuit 84 which is constituted by transistors Q29 and Q30, and a transistor Q31. That is, the charge of the capacitor C2 is fed-back to the base of the transistor Q25. As a result, a base potential of the transistor Q25 increases until the same becomes the same level as a base potential of the transistor Q24. Then, an output signal of the low-pass filter 24 is withdrawn from an output end 86 which is connected to the base of the transistor Q25. In addition, the output end 86 is connected to the base of the transistor Q24 via a resistor $R_E$.

Furthermore, if a collector current of the transistor Q29 is $I_{Q29}$, a current of $I_{Q29}/\beta_N$ is applied to the base of the transistor Q26. The current is multiplied by $\beta_P$ at the transistor Q27, and further multiplied by $1/\beta_P$ at the transistor Q28. Therefore, a current of $I_{Q29}/\beta_N$ is supplied to the base of the transistor Q29. That is, a base current of the transistor Q29 is compensated by a base current of the transistor Q28.

Next, a frequency characteristic of the low-pass filter 24 will be described. In addition, in the low-pass filter 24, it is set that $R_G = 2R_F$, and an input voltage is $v_i$, an output voltage is $v_o$, a current of the transistor Q24 is i, and a base current of the transistor Q28 is I.

$$v_i - v_o = \Delta v = \frac{R_E}{R_D + R_E} v_i - \frac{R_D}{R_D + R_E} v_o \quad (5)$$

$$i = \frac{\Delta v}{2re} \quad (6)$$

Where, re is an emitter resistor (differential resistor) of each of the transistors Q24 and Q25.

Therefore, following equations (9)–(14) are obtainable on the basis of the following equations (7) and (8) and the above described equation (6).

$$I = i \cdot \frac{1}{\beta_N} \cdot \beta_P \cdot \frac{1}{\beta_P} = \frac{i}{\beta_N} \quad (7)$$

$$V_o = \frac{1}{j\omega C} \times I \quad (8)$$

$$I = \frac{i}{\beta_N} = \frac{\Delta v}{\beta_N \cdot 2re} \quad (9)$$

$$\frac{\Delta v}{\beta_N \cdot 2re} \times \frac{1}{j\omega C} = V_o \quad (10)$$

$$v_o = \frac{\Delta v}{2re \cdot \beta_N \cdot j\omega C} \quad (11)$$

$$= \frac{\left(\frac{R_E}{R_D + R_E} v_i - \frac{R_D}{R_D + R_E} v_o\right)}{2re \cdot \beta_N \cdot j\omega C}$$

$$= \frac{R_E v_i - R_D v_o}{2re \cdot \beta_N \cdot j\omega C(R_D + R_E)}$$

$$v_o\left(1 + \frac{R_D}{2re \cdot \beta_N \cdot j\omega C(R_D + R_E)}\right) \quad (12)$$

$$= \frac{R_E \cdot v_i}{2re \cdot \beta_N \cdot j\omega C(R_D + R_E)}$$

$$v_o\{2re \cdot \beta_N \cdot j\omega C(R_D + R_E) + R_D\} = R_E v_i \quad (13)$$

$$\frac{v_o}{v_i} = \frac{R_E}{2re \cdot \beta_N \cdot j\omega C(R_D + R_E) + R_D} \quad (14)$$

Then, "B/(A+j$\omega$C)" of the above described equation (14) indicates a cut-off frequency of the low-pass filter 24. In addition, $A = R_D/\{2re \cdot \beta_N \cdot (R_D + R_E)\}$ and $B = R_E/\{2re \cdot \beta_N \cdot (R_D + R_E)\}$.

In FIG. 11 embodiment, the double-Darington circuit of the transistors Q29 and Q30 functions as a high-impedance circuit, and therefore, the same may be constructed by only the transistor Q29 according to circumstances. Furthermore, instead of the double-Darington circuit 84, an inverted Darington circuit may be utilized.

In a low-pass filter 24 of another embodiment shown in FIG. 12, a discharging path of the capacitor C2 in the low-pass filter shown in FIG. 11, that is, a circuit of transistors Q22 and Q21 is replaced with the transistor Q25 which is included in the input differential pair 78. Therefore, the charge of the capacitor C2 is discharged through the transistor Q25. A charging operation of the capacitor C2 is similar to that of FIG. 11. Furthermore, on the assumption that a collector current of a transistor Q32 is $I_{Q32}$, a current of $I_{Q32}/\beta_N$ is supplied to a base of the transistor Q32 through the transistors Q26, Q27 and Q28.

In the circuits of the above described low-pass filter 24, if the types of all the transistors are inverted, in the above description, the charging becomes the discharging and the discharging becomes the charging, and therefore, such a circuit operates as similar to the above described circuit.

Figure 13:
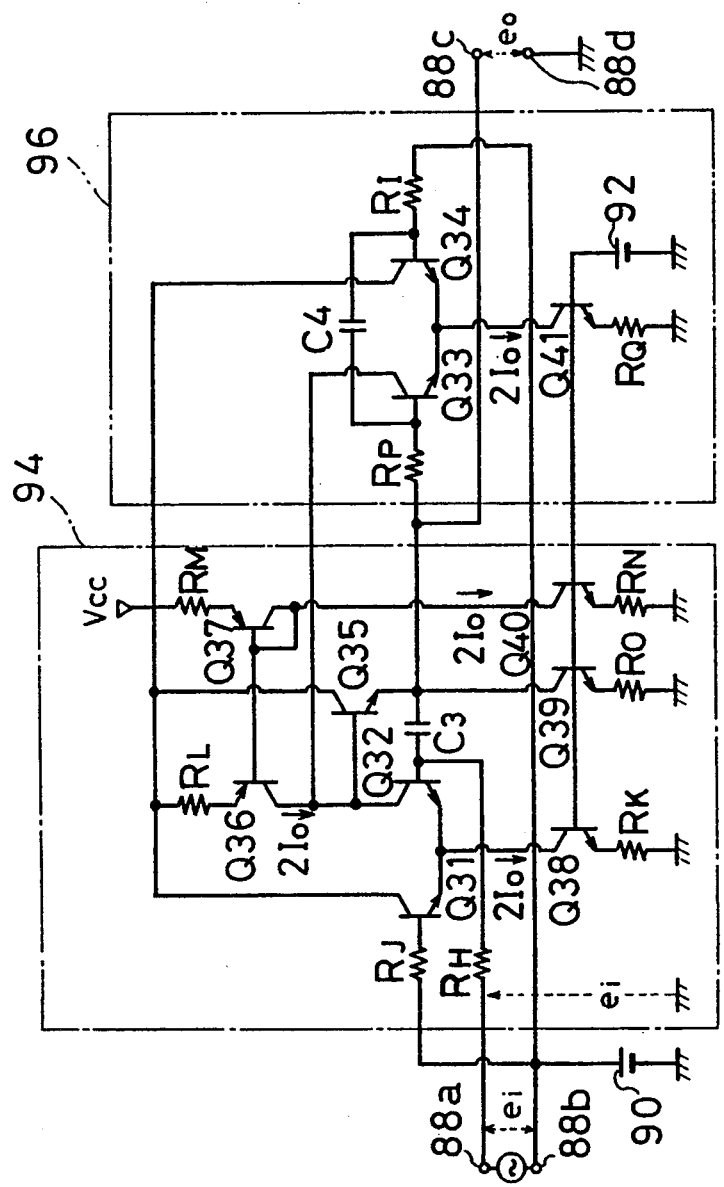
FIG. 13 is a circuit diagram showing one example of a phase-shifter which is used in FIG. 1 embodiment.

FIG. 13 is a block diagram showing one example of the first phase-shifter 22 which is utilized in FIG. 1 embodiment. In addition, the second phase-shifter 28 also has the same circuit configuration. Transistors Q31 and Q32 are connected to each other in a differential manner, and an input end 88a is connected to a base of the transistor Q32 through a resistor $R_H$. An input end 88b is connected to a (+) of a constant voltage source 90 having a (−) connected to the ground. Furthermore, transistors Q33 and Q34 are connected to each other in a differential manner, and the input end 88b is connected to a base of the transistor Q34 through a resistor $R_I$. Furthermore, the input end 88b is further connected to a base of the transistor Q31 through a resistor $R_J$.

Emitters of the transistors Q31 and Q32 are commonly connected to the ground through a series connection circuit of a transistor Q38 and a resistor $R_K$. A collector of the transistor Q31 is directly connected to a voltage source Vcc, and a collector of the transistor Q32 is connected to the voltage source Vcc through a series connection circuit of a transistor Q36 and a resistor $R_L$. A connection point of a collector of the transistor Q32 and a collector of the transistor Q36 is connected to a base of the transistor Q35 and a collector of the transistor Q33.

A base of the transistor Q36 is connected to a base and a collector of a transistor Q37, and an emitter of the transistor Q37 is connected to the voltage source Vcc through a resistor $R_M$. The transistors Q36 and Q37 constitute a current mirror circuit. A collector of the transistor Q37 is connected to the ground through a series connection circuit of a transistor Q40 and a resistor $R_N$. A collector of the transistor Q35 is directly connected to the voltage source Vcc, and emitter thereof is connected to the ground through a series connection circuit of a transistor Q39 and a resistor $R_O$.

A base of the transistor Q32 is connected to a base of the transistor Q33 through a series connection circuit of a capacitor C3 and a resistor $R_P$. A connection point of the capacitor C3 and the resistor $R_P$ is connected to an output end 88c. An output end 88d is connected to the ground. A capacitor C4 is inserted between a base of the transistor Q3 and a base of the transistor Q34, and emitters of the transistors Q33 and Q34 are commonly connected to the ground through a series connection circuit of a transistor Q41 and a resistor $R_Q$. Bases of the transistors Q38, Q39, Q40 and Q41 are commonly connected to a (+) of a constant voltage source 92 having a (−) connected to the ground.

That is, the first phase-shifter 22 includes an alternating current negative feed-back amplifying circuit 94 which is constructed by the transistors Q31, Q32, Q35, Q36, Q37, Q38, Q39 and Q40, the resistor $R_H$ and the capacitor C3 which constitute a high-pass filter, and etc., and surrounded by a one-dotted line in FIG. 12. The first phase-shifter 22 further includes a direct current negative feed-back circuit 96 which is constructed by the resistors $R_P$ and $R_J$ and the capacitor C4 which constitute a low-pass filter, the transistors Q33 and Q34, and etc., and surrounded by a two-dotted line in FIG. 12. The negative feed-back circuit 96 feeds-back a direct current signal to the negative feed-back amplifying circuit 94.

In addition, the transistors Q38, Q39, Q40 and Q41 constitute a constant current source, and the resistors $R_K$, $R_N$ and $R_K$ have the same resistance value. Therefore, collector currents of the transistors Q38, Q40 and Q41 are the same, and therefore, if the current value is $2I_0$, since the transistors Q36 and Q37 constitute a current mirror circuit, a collector current of the transistor Q36 becomes $2I_0$ if the resistors $R_L$ and $R_M$ have the same resistance value.

Next, an alternating current operation of the first phase-shifter will be described. The base of the transistor Q31 is connected to the ground in alternating current. The transistor Q36 functions as a load for withdrawing an output of the differential connection transistors Q31 and Q32 in a form of current, and an alternating current load becomes very large value and therefore, an open loop gain A is sufficiently large. When the collector current of the transistor Q32 varies, the base current of the transistor Q35 is varied, and an output is withdrawn in a form of voltage through an emitter-follower of the transistor Q35. An output voltage $e_o$ outputted from the emitter-follower of the transistor Q35 is supplied to the high-pass filter of the capacitor C3 and the resistor $R_H$. Therefore, the base potential of the transistor Q32 is given by the following equation.

$$e_i \frac{1}{j\omega C3 R_H + 1} + e_o \frac{j\omega C3 R_H}{j\omega C3 R_H + 1} \tag{15}$$

Then, the base potential of the transistor Q31 is connected to the ground in alternating current, and therefore, a relationship between an input voltage $e_i$ and an output voltage $e_o$ is given by the following equation (16).

$$e_o = \left\{ 0 - \left( e_i \frac{1}{j\omega C3 R_H + 1} + e_o \frac{j\omega C3 R_H}{j\omega C3 R_H + 1} \right) \right\} A \tag{16}$$

When it is considered that the open loop gain A is sufficiently large, the equation (16) is modified to the following equation (17), and therefore, it will be understood that a phase-shifting amount becomes 90 degree.

$$-e_i = e_o \left[ \frac{1}{A} + j\omega C3 R_H \right] \tag{17}$$

$$-e_i \simeq e_o j\omega C3 R_H$$

Furthermore, since the higher frequency of the input voltage $e_i$, the smaller output voltage $e_o$, no oscillation occurs. Therefore, a resistor and a capacitor for preventing an oscillation becomes unnecessary. Furthermore, no phase deviation due to characteristics of circuit components occurs, and therefore, the phase-shifting amount does not deviate from the 90 degrees.

Next, a direct current operation will be described. In the negative feed-back amplifying circuit 94, an alternating current component is fed-back, but a direct current component cannot be fed-back due to the capacitor C3. Therefore, an emitter voltage of the transistor Q35 becomes indefinite, and therefore, the negative feed-back amplifying circuit 94 does not operate as it is. However, a direct current component of a voltage outputted from the emitter-follower of the transistor Q35 is supplied to the low-pass filter of the resistors $R_P$ and $R_J$ and the capacitor C4, and to the base of the transistor Q33 of the differential connection transistors Q33 and Q34. A constant voltage is supplied to the base of the transistor Q34 from the constant voltage source 92, and therefore, if base currents of the transistors Q33 and Q34 and a voltage drop due to the resistors $R_P$ and $R_J$ are ignored, since a dividing ratio of the collector current $2I_0$ of the transistor Q41 varies in accordance with a difference between the both base voltages, the collector current of the transistor Q33 is changed.

Since the direct current voltage at the basis of the transistors Q31 and Q32 is maintained at the voltage of the constant voltage source 92, if the base currents of the transistors Q31 and Q32 and a voltage drop due to the resistor $R_H$ and $R_J$ are ignored, the collector currents flowing the transistors Q31 and Q32 becomes $I_0$ which is a half of the collector current $2I_0$ of the transistor Q38.

Furthermore, since the collector current of the transistor Q36 becomes $2I_0$, when the base current of the transistor Q35 is small and thus can be ignored, the collector current of the transistor Q33 becomes $I_0$ which is obtained by subtracting the collector current of the transistor Q32 from the collector current of the transistor Q36. Then, in order to make the collector current of the transistor Q3 $I_0$, the base voltages of the transistors Q33 and Q34 must be equal to each other because the collector current of the transistor Q41 is $2I_0$, and the direct current voltage of the emitter of the transistor Q35 is fixed at the voltage of the constant voltage source 92, and therefore, the negative feed-back amplifying circuit 94 can normally operate with an operation point at this voltage.

Next, with referring to FIG. 14, another embodiment according to the present invention will be described. A point that FIG. 14 embodiment is different from FIG. 2 embodiment is that the control of the first phase-comparator 18 is performed by only the output of the level-comparator 36 in FIG. 2 embodiment while in FIG. 14 embodiment, a control signal for the first phase-comparator 18 is changed in accordance with a synchronized state or a non-synchronized state. More specifically, in the synchronized state, the first phase-comparator 18 is enabled by the signal from the aforementioned second phase-comparator 30, that is, the burst gate pulse BGP from the level-comparator 36, but, in the non-synchronized state, the first phase-comparator 18 is enabled by the burst timing signal which is a pulse wider than the burst gate pulse as shown in FIG. 3(B). By such construction, even if the electric field is weak, it is possible to perform a phase control with accuracy. In addition, in the synchronized state, FIG. 14 embodiment performs an operation similar to that of FIG. 2 embodiment, and therefore, a description thereof will be omitted here.

In FIG. 14 embodiment, in the non-synchronized state, the input chrominance signal is supplied to one input of the first phase-comparator 18 after the same is delayed by the first all-pass filter 14. On the other hand, the reference carrier wave signal from the fixed oscillator 20 is phase-shifted by 90 degrees by the first phase-shifter 22, and thereafter, supplied to the other input of the first phase-comparator 18. Then, in the first phase-comparator 18, the phases of the signals supplied to the two inputs are compared with each other.

If a jitter component exists in the inputted chrominance signal, a phase difference signal is outputted from the first phase-comparator 18 and supplied to the first all-pass filter 14 as the control signal therefor via the first low-pass filter 24 and the capacitor 26 for cutting-off a direct current component. That is, in accordance with magnitude of the jitter component, the first all-pass filter 14 is controlled by the negative feed-back, and therefore, a delay time of the first all-pass filter 14 is controlled.

On the other hand, the chrominance signal through the first all-pass filter 14 is also supplied to one input of the second phase-comparator 30. In addition, the reference carrier wave signal from the first phase-shifter 22 is further phase-shifted by 90 degrees by the second phase-shifter 28. Therefore, an output of the second phase-shifter 28 becomes a signal that is an inversion of the original reference carrier wave signal, and supplied to the other input of the second phase-shifter 30. Therefore, in the non-synchronized state, in the second phase-comparator 30, a maximum modulated output becomes not to be obtained during a period of burst signal BURST (FIG. 3), and therefore, synchronization signals a part of which is dropped-out are inputted to the level-comparator 36 from the second phase-comparator 30 so as to be compared with the reference voltage 38. Therefore, in the non-synchronized state, the burst gate pulse BGP as shown in FIG. 3(C) is not continuously applied to the first phase-comparator 18 from the level-comparator 36. On the other hand, a discontinuous burst gate pulse BGP from the level-comparator 36 is smoothed by a third low-pass filter 98 having a relatively large time constant, and therefore, a low level signal is produced, and the low level signal is applied to one input of an AND gate via an inverter. Therefore, in the non-synchronized state, in accordance with a function of the AND gate 100, a pulse (a pulse shown in FIG. 3(B) wider than the above described burst gate pulse BGP, that is, the burst timing signal is supplied to the first phase-comparator 18 as it is, and therefore, the first phase-comparator 18 is enabled at that timing.

In addition, in FIG. 14 embodiment, an enabling timing of the first phase-comparator 18 is changed in the synchronized state or non-synchronized state, but an operation of the first phase-comparator 18 may be stopped in the non-synchronized state.

In an embodiment shown in FIG. 15, in order to embody the present invention in the PAL system, there are provided with a line counter 102 and a switch 104. The line counter 102 counts the horizontal synchronization signal $H_{sync}$ to apply a switching signal for each line to the switch 104. More specifically, in odd-number lines (or even-number lines), the switch 104 is connected to a contact 104a and, in even-number lines (or odd-number lines), the switch 104 is switched to a contact 104b. Therefore, in the odd-number lines (or even-number lines), the reference signal from the oscillator 20 is phase-shifted by 90 degrees by the first phase-shifter 22; however, in the even-number lines (or odd-number lines), the reference signal is applied to the first phase-comparator 18 with no phase-shifting.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A burst phase correcting circuit, comprising:
    first variable delay means which receives a chrominance signal, and delays said chrominance signal with a delay time according to a control signal, and outputs the chrominance signal;
    reference signal generating means for generating a reference signal;
    first phase-shifting means for phase-shifting said reference signal by 90 degrees;
    timing signal applying means for applying a timing signal;
    first phase-comparing means for comparing a phase of an output of said first variable delay means with a phase of an output of said first phase-shifting means in response to said timing signal to output a signal according to a difference between the both phases;
    a first low-pass filter for receiving said signal from said first phase-comparing means; and
    a capacitor for applying only an alternating current component included in an output of said first low-pass filter to said first variable delay means as said control signal;
    wherein said timing signal applying means includes burst signal demodulating means for applying a burst gate signal which is obtained by demodulating a burst signal included in the output of said first variable delay means to said first phase-comparing means.

2. A burst phase correcting circuit according to claim 1, wherein said first variable delay means includes a time constant circuit having a time constant which varies in accordance with said control signal.

3. A burst phase correcting circuit according to claim 2, wherein said time constant circuit includes an equivalent inductance circuit having an inductance value which varies in accordance with said control signal.

4. A burst phase correcting circuit according to claim 3, wherein said first variable delay means includes an all-pass filter containing said time constant circuit.

5. A burst phase correcting circuit according to claim 1, wherein said burst signal demodulating means includes second phase-shifting means for further phase-shifting the output of said first phase-shifting means by 90 degrees; second phase-comparing means for comparing the phase of the output of said first variable delay means with a phase of an output of said second phase-shifting means in response to said timing signal to output a signal according to a difference between the both phases; a second low-pass filter for receiving an output of said second phase-comparing means; and level-comparing means for comparing an output of said second low-pass filter with a reference level to generate said burst gate signal.

6. A burst phase correcting circuit according to claim 1, wherein said first low-pass filter includes an input end for receiving an output of said first phase-comparing means; an input differential pair which includes a first transistor having a base connected to said input end via a first resistor, and a second transistor; a capacitor which is charged or discharged in accordance with the output of said first phase-comparing means; a high input impedance buffer for negative-feeding a charged or discharged voltage of said capacitor back to a base of said second transistor; and an output end connected to said input end via a second resistor.

7. A burst phase correcting circuit according to claim 1, wherein said first low-pass filter includes an input end for receiving an output of said first phase-comparing means; an input differential pair which includes a first transistor having a base connected to said input end, and a second transistor; and a capacitor which is charged or discharged in accordance with the output of said first phase-comparing means, said second transistor being used as a charge or discharge path for said capacitor; and further includes an output end connected to said input end via a second resistor.

8. A burst phase correcting circuit according to claim 1, wherein said first low-pass filter includes an input differential pair for receiving an output of said first phase-comparing means; a capacitor which is charged or discharged in accordance with the output of said first phase-comparing means; an amplifying circuit connected to said capacitor; and a compensating circuit for compensating an input current of said amplifying circuit.

9. A burst phase correcting circuit according to claim 1, wherein said first phase-shifting means includes a negative feed-back amplifying circuit which includes a negative feed-back loop and amplifies said reference signal.

10. A burst phase correcting circuit according to claim 9, wherein said first phase-shifting means includes a capacitor inserted in said negative feed-back loop in said negative feed-back amplifying circuit; and a resistor inserted in an input path which inputs an input signal to said negative feed-back loop, said negative feed-back loop feeding a direct current component of an output signal back to said negative feed-back amplifying circuit.

11. A burst phase correcting circuit according to claim 1,
wherein said first low-pass filter includes an input differential pair for receiving an output of said first phase-comparing means; an amplifying circuit connected to said capacitor; and a compensating circuit for compensating an input current of said amplifying circuit; and
wherein said first phase-shifting means includes a capacitor inserted in said negative feed-back loop in said negative feed-back amplifying circuit; and a resistor inserted in an input path which inputs an input signal to said negative feed-back loop, said negative feed-back loop feeding a direct current component of an output signal back to said negative feed-back amplifying circuit.

12. A burst phase correcting circuit, comprising:
first variable delay means which receives a chrominance signal, and delays said chrominance signal with a delay time according to a control signal, and outputs the chrominance signal;
reference signal generating means for generating a reference signal;
first phase-shifting means for phase-shifting said reference signal by 90 degrees;
timing signal applying means for applying a timing signal;
first phase-comparing means for comparing a phase of an output of said first variable delay means with a phase of an output of said first phase-shifting means in response to said timing signal to output a signal according to a difference between the both phases;
a first low-pass filter for receiving said signal from said first phase-comparing means;
a capacitor for applying only an alternating current component included in an output of said first low-pass filter to said first variable delay means as said control signal; and
second variable delay means for receiving a luminance signal, said second variable delay means being controlled by said control signal from said capacitor;
wherein said timing signal applying means includes bursts signal demodulating means for applying a burst gate signal which is obtained by demodulating a burst signal included in the output of said first variable delay means to said first phase comparing means.

13. A television signal processing apparatus, comprising:
first variable delay means which receives a chrominance signal, and delays said chrominance signal with a delay time according to a control signal, and outputs the chrominance signal;
reference signal generating means for generating a reference signal;
first phase-shifting means for phase-shifting said reference signal by 90 degrees;
timing signal applying means for applying a timing signal;
first phase-comparing means for comparing a phase of an output of said first variable delay means with a phase of an output of said first phase-shifting means in response to said timing signal to output a signal according to a difference between the both phases;
a first low-pass filter for receiving said signal from said first phase-comparing means; and
a capacitor for applying only an alternating current component included in an output of said first low-pass filter to said first variable delay means as said control signal;
wherein said timing signal applying means includes burst signal demodulating means for applying a burst gate signal which is obtained by demodulating a burst signal included in the output of said first variable delay means to said first phase-comparing means.

* * * * *